(12) United States Patent
Zhou et al.

(10) Patent No.: US 8,743,752 B2
(45) Date of Patent: Jun. 3, 2014

(54) METHOD AND APPARATUS FOR STATUS TRANSITION

(75) Inventors: Na Zhou, Shenzhen (CN); Shuang Liang, Shenzhen (CN); Jing Wang, Shenzhen (CN); Yuzhen Huo, Shenzhen (CN); Zaifeng Zong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 57 days.

(21) Appl. No.: 13/258,408

(22) PCT Filed: Dec. 21, 2009

(86) PCT No.: PCT/CN2009/075770
§ 371 (c)(1),
(2), (4) Date: Mar. 27, 2012

(87) PCT Pub. No.: WO2010/145145
PCT Pub. Date: Dec. 23, 2010

(65) Prior Publication Data
US 2012/0170495 A1  Jul. 5, 2012

(30) Foreign Application Priority Data

Sep. 27, 2009 (CN) .......................... 2009 1 0178822

(51) Int. Cl.
*H04W 4/00*  (2009.01)
(52) U.S. Cl.
USPC ........... 370/310; 370/350; 370/225; 370/228; 370/329; 370/328
(58) Field of Classification Search
USPC ......... 370/350, 310, 225, 228, 329, 341, 522, 370/331, 328
See application file for complete search history.

(56) References Cited

U.S. PATENT DOCUMENTS

| 6,693,886 | B1 * | 2/2004 | Haikonen et al. | 370/338 |
| 7,945,273 | B2 * | 5/2011 | Flint | 455/458 |
| 8,243,615 | B2 * | 8/2012 | Hamalainen et al. | 370/252 |
| 8,320,291 | B2 * | 11/2012 | Rune et al. | 370/312 |

(Continued)

FOREIGN PATENT DOCUMENTS

| CN | 101242645 A | 8/2008 |
| CN | 101325583 A | 12/2008 |

(Continued)

OTHER PUBLICATIONS

International Search Report in international application No. PCT/CN2009/075770, mailed on Jul. 1, 2010.

(Continued)

*Primary Examiner* — Andrew Lai
*Assistant Examiner* — Andrew C Lee
(74) *Attorney, Agent, or Firm* — Oppedahl Patent Law Firm LLC

(57) ABSTRACT

A method and apparatus for status transition are provided in the disclosure, which enable a wireless side network element to judge that a service request message is a paging response message after receiving the service request message, transmit an initial user equipment message to a mobility management entity, and indicate that the service request message is valid in the initial user equipment message. The method and apparatus of the disclosure solve the problem that the mobility management entity is unable to make a correct judgment and corresponding logical processing, and improve processing efficiency of the mobile communication system effectively.

19 Claims, 8 Drawing Sheets

(56) References Cited

U.S. PATENT DOCUMENTS

| | | | |
|---|---|---|---|
| 8,472,377 B2* | 6/2013 | Becker et al. | 370/328 |
| 8,477,811 B2* | 7/2013 | Kitazoe | 370/503 |
| 8,483,177 B2* | 7/2013 | Kwon et al. | 370/331 |
| 2005/0002407 A1* | 1/2005 | Shaheen et al. | 370/401 |
| 2007/0207806 A1* | 9/2007 | Shaheen | 455/436 |
| 2008/0256220 A1* | 10/2008 | Bachmann et al. | 709/222 |
| 2008/0259912 A1* | 10/2008 | Wang et al. | 370/356 |
| 2008/0261596 A1* | 10/2008 | Khetawat et al. | 455/436 |
| 2009/0170426 A1 | 7/2009 | Jung et al. | |
| 2009/0247160 A1* | 10/2009 | Muller | 455/435.3 |
| 2009/0257353 A1* | 10/2009 | Song et al. | 370/241 |
| 2009/0268635 A1* | 10/2009 | Gallagher et al. | 370/254 |
| 2009/0270099 A1* | 10/2009 | Gallagher et al. | 455/435.1 |
| 2009/0285157 A1* | 11/2009 | Yeoum et al. | 370/328 |
| 2010/0074129 A1* | 3/2010 | Wang et al. | 370/252 |
| 2010/0075635 A1* | 3/2010 | Lim et al. | 455/411 |
| 2010/0075698 A1* | 3/2010 | Rune et al. | 455/458 |
| 2010/0080171 A1* | 4/2010 | Rune et al. | 370/328 |
| 2010/0098023 A1* | 4/2010 | Aghili et al. | 370/331 |
| 2010/0240400 A1* | 9/2010 | Choi | 455/458 |
| 2010/0278142 A1* | 11/2010 | Dwyer et al. | 370/331 |
| 2010/0279691 A1* | 11/2010 | Dwyer et al. | 455/436 |
| 2010/0329205 A1* | 12/2010 | Bi et al. | 370/331 |
| 2011/0080867 A1* | 4/2011 | Mildh | 370/328 |

FOREIGN PATENT DOCUMENTS

| | | |
|---|---|---|
| CN | 101330720 A | 12/2008 |
| JP | 2004336774 A | 11/2004 |
| JP | 2006518122 A | 8/2006 |
| JP | 2009111624 A | 5/2009 |
| JP | 2009130405 A | 6/2009 |
| JP | 2009159608 A | 7/2009 |
| JP | 2009530090 A | 8/2009 |
| JP | 2009200644 A | 9/2009 |
| JP | 2010519840 A | 6/2010 |
| JP | 2010534961 A | 11/2010 |
| WO | 2004075576 A1 | 9/2004 |
| WO | 2008102099 A1 | 8/2008 |
| WO | 2009015595 A1 | 2/2009 |
| WO | 2009116691 A1 | 9/2009 |

OTHER PUBLICATIONS

English Translation of the Written Opinion of the International Search Authority in international application No. PCT/CN2009/075770, mailed on Jul. 1, 2010.

3GPP TS 24.008 V8.6.0 Jun. 2009.

3GPP TS 36.331 V8.6.0 Jun. 2009.

3GPP TS 24.301 V8.2.1 Jun. 2009.

* cited by examiner

METHOD AND APPARATUS FOR STATUS TRANSITION

TECHNICAL FIELD OF THE INVENTION

The disclosure relates to the field of mobile communication, specifically to a method and apparatus for status transition.

BACKGROUND OF THE INVENTION

Third Generation Partnership Project (3GPP) Evolved Packet System (EPS) is composed of Evolved Universal Terrestrial Radio Access Network (E-UTRAN), Mobility Management Entity (MME), Serving Gateway (S-GW), Packet Data Network Gateway (P-GW), Home Subscriber Server (HSS), AAA (Authentication, Authorization and Accounting) server of 3GPP, Policy and Charging Rules Function (PCRF) entity and other support nodes.

FIG. 1 is a schematic diagram of an EPS system architecture according to related technology; as shown in FIG. 1, a mobility management entity is responsible for related work of control plane, such as mobility management, non-access stratum signaling is processing and user mobility management context management and the like. The S-GW is an access gateway equipment, which connects with E-UTRAN and forwards data between E-UTRAN and P-GW, and is responsible for caching paging waiting data. The P-GW is a border gateway of EPS and Packet Data Network (PDN), and is responsible for functions such as access of the PDN, and forwarding data between the EPS and the PDN and the like. Both the S-GW and the P-GW belong to core network gateway.

H(e)NB is a small and low-power base station, which is disposed in indoor venues such as home, office and the like; the main function of the H(e)NB is to provide higher service rate for user and reduce cost required for using high rate service, and make up inadequate coverage of existing distributed cellular wireless communication system. The advantages of H(e)NB are: economical, convenient, low power output, plug and play and the like. In H(e)NB system, H(e)NB is wireless side network element.

FIG. 2 is a schematic diagram II of an EPS system architecture according to related technology; as shown in FIG. 2, a H(e)NB can access to a core network through a H(e)NB gateway which is a logic network element, and also can connect to a core network directly (as shown in FIG. 1), wherein the main function of the H(e)NB gateway is: verifying the security of the H(e)NB, handling registration of the H(e)NB, performing operation, maintenance and management to the H(e)NB, configuring and controlling the H(e)NB according to requirement of operator, and taking responsibility for exchanging data of core network and H(e)NB.

In addition to supporting access of mobile core network, mobile communication system (including the H(e)NB system) can also support local IP access function. Under the condition that the wireless side network element has the ability of local IP access and user subscription allows local IP access, local access of a terminal to other IP equipment of home network or Internet can be implemented.

Multiple connection establishment ways can be adopted to implement the local IP access: core network access function and local IP access function can be implemented simultaneously by establishing a connection (as shown in FIG. 1 and FIG. 2). At this time, function of local gateway is not needed to be added to the wireless side network element or the H(e)NB gateway.

FIG. 3 is a schematic diagram III of an EPS system architecture according to related technology; as shown in FIG. 3, the above implement of the local IP access can also provide effective support to local IP access technology through adding local gateway. The local gateway, which is taken as a gateway for local access to external network (e.g., Internet), provides functions such as address assignment, charging, packet filtering, strategy control, traffic offload function, NAS/S1-AP/Radios Access Network Application Part (RANAP)/General Tunneling Protocol (GTP)/Proxy Mobile IP (PMIP)/Mobile IP (MIP) message analysis, Network Address Translation (NAT), routing and executing local IP access strategy and the like. The local gateway can be jointly configured with a wireless side network element.

FIG. 4 is a schematic diagram IV of an EPS system architecture according to related technology; FIG. 5 is a schematic diagram V of an EPS system architecture according to related technology. In the presence of a H(e)NB gateway, a local gateway can not only be jointly configured with a H(e)NB (as shown in FIG. 4), but also can be jointly configured with the H(e)NB gateway (as shown in FIG. 5).

Wherein the local gateway can be a Local SGW (L-SGW) and a Local PGW (L-PGW), and also can be an individual L-PGW, or a traffic offload function entity. Furthermore, the H(e)NB gateway can be jointly configured with the H(e)NB.

For Universal Terrestrial Radio Access Network (UTRAN) system, core network gateway can be Serving GPRS Support Node (SGSN), or Gateway GPRS Support Node (GGSN). Local gateway can be Local GGSN (L-GGSN) and Local SGSN (L-SGSN), or also can be individual L-GGSN.

Taking Long Term Evolution (LTE) mobile communication network architecture as an example, FIG. 6 is a data stream schematic diagram I of local IP access and core network connection based on the wireless communication system in FIG. 1 according to related technology; as shown in FIG. 6, FIG. 6 shows schematic data stream of the local IP access and the core network connection in the wireless communication system of FIG. 1. FIG. 7 is a data stream schematic diagram II of local IP access and core network connection based on the wireless communication system in FIG. 2 according to related technology; as shown in FIG. 7, FIG. 7 shows schematic data stream of the local IP access and the core network connection in the wireless communication system of FIG. 3.

FIG. 8 is an interactive flowchart of a wireless side network element paging terminal according to related technology; as shown in FIG. 8, situation based on the system architecture of FIG. 3, in which a local access gateway is an L-SGW or/and an L-PGW, comprises the following steps from step S802 to step S808:

step S802: a terminal has an local IP access connection and an core network connection after accessing to a wireless communication system, and then the terminal enters idle state;

step S804: downlink data of the local IP connection reaches a wireless side network element/local gateway;

step S806: the wireless side network element initiates a paging message to the terminal;

step S808: the wireless side network element sets a paging waiting timer.

FIG. 9 is an interactive flowchart showing that a terminal performs service request process when transiting from idle state to connected state according to related technology; as shown in FIG. 9, FIG. 9 comprises the following steps from step S902 to step S912:

step S902: a terminal has a local IP access connection and a core network connection after accessing to a wireless communication system, and then the terminal enters idle state;

step S904: the terminal transmits a service request message to a mobility management entity via a wireless side network element;

step S906: executing NAS identification process; this step is optional;

step S908: the mobility management entity transmits an initial context setup request message to the wireless side network element;

step S910: the wireless side network element executes radio bearer establishment process;

step S912: the wireless side network element responds an initial context setup complete message to the mobility management entity.

It can be seen from the above process that, the paging waiting timer is set in step S808, but trigger conditions for deleting the timer are not embodied in FIG. 9. Simultaneously, if the service request message (in step S904) is triggered by wireless side network element paging (in step S806), then the reason carried by the service request message transmitted by the terminal is paging response. Under the condition that the mobility management entity does not transmit the paging message, the mobility management entity can not distinguish whether the service request message is triggered by paging of the wireless side network element (in Step S806) or belongs to an abnormal message. Therefore, the meaning of the reason code is unclear, thus resulting in that the mobility management entity is unable to make a correct judgment and corresponding processing operation.

SUMMARY OF THE INVENTION

The invention is provided to solve the problem that a mobility management entity is unable to distinguish whether a message transmitted by a terminal is a service request message in which reason code carried is paging response, or is an abnormal message, thus resulting in that the mobility management entity can not make a correct judgment and corresponding processing operation. Therefore, the main purpose of the disclosure is to provide a method and apparatus for status transition to solve the above problem.

To achieve the above purpose, the technical scheme of the disclosure is implemented as follows.

A method for status transition, applied to a local IP access connection process of a wireless side network element or a H(e)NB gateway, comprises:

sending a service request message to a mobility management entity after receiving it from the UE as paging response, and indicating that the service request message is valid in initial UE message.

The method for indicating that the service request message is valid comprises:

modifying service type IE to indicate "data" or "signaling" which is taken as reason code in the service request message, wherein the reason code represents UE has pending user data or signaling to be sent; or carrying reason code in an initial user equipment message, wherein the reason code represents that the service request message is a response message of paging performed by the wireless side network element; the paging response message is a response to the paging of the wireless side network element or the H(e)NB gateway.

The reason code is contained in at least one of the following information:

a radio resource control establishment code;

an indication or service type;

a new cell added by expanding existing message format.

The method further comprises: stopping a paging waiting timer before judging that the service request message is the paging response message, wherein, determining that the service request message is the paging response in the presence of a paging waiting timer or when the wireless side network element initiates a paging message within a predetermined period of time.

The method further comprises:

judging that the service request message is not a paging response, determining not to modify reason code in the initial user equipment message.

The mobility management entity comprises one of the followings:

a mobile management unit, a mobile switching center and a serving general packet radio service support node.

The wireless side network element comprises one of the followings:

a base station, a H(e)NB, a radio network controller and a local gateway.

The local gateway comprises one of the followings:

a local service gateway and local packet data network gateway, a local packet data network gateway, a local serving general packet radio service support node and local gateway general packet radio service support node, a local gateway general packet radio service support node, and a traffic offload function entity.

The local IP access connection comprises one of the followings:

a local IP access to residential IP network, a local IP access to enterprise IP network, a local IP access to Internet, a internet offload, a selected IP traffic offload.

An apparatus for status transition, comprises:

a receiving module, which is configured to receive a service request message from a terminal;

a judging module, which is configured to notify a transmitting module when judging that the service request message is a paging response message;

the transmitting module, which is configured to transmit a initial user equipment message to a mobility management entity according to the notification of the judging module; wherein, the initial user equipment message is used for indicating that the service request message is valid.

The transmitting module comprises:

a first carrying sub-module, which is configured to modify service type IE to indicate "data" or "signaling" which is taken as reason code in the service request message, wherein the reason code represents UE has pending user data or signaling to be sent;

a second carrying sub-module, which is configured to carry reason code in the initial user equipment message, wherein the reason code represents that the service request message is a response message to the paging performed by a wireless side network element.

Through the disclosure, the service request message is adopted to trigger the wireless side network element to stop the paging waiting timer, and the wireless side network element or the H(e)NB gateway notifies the mobility management entity of the correct reason code, so as to solve the problem that the mobility management entity is unable to distinguish whether a message transmitted by the terminal is a service request message in which reason code carried is paging response, or is an abnormal message, thus resulting in that the mobility management entity can not make a correct judgment and corresponding processing operation, thereby improving processing efficiency of the mobile communication system.

BRIEF DESCRIPTION OF THE DRAWINGS

The accompanying drawings illustrated herein are used to provide a further understanding of the disclosure, which constitute a part of the application. The schematic embodiments of the disclosure and the description thereof are used for explaining the disclosure, and do not constitute an improper limitation to the disclosure. In the accompanying drawings.

DETAILED DESCRIPTION OF THE INVENTION

In view of the problem in related technology that a mobility management entity is unable to distinguish whether a message transmitted by a terminal is a service request message in which reason code carried is a paging response, or is an abnormal message, thus resulting in that a mobility management entity can not make a correct judgment and corresponding processing operation, the disclosure provides a status transition scheme. A wireless side network element judges that a service request message is a response message of paging a wireless side network element or a H(e)NB gateway after receiving the service request message transmitted by a terminal, transmits an initial user equipment message to a mobility management entity, and indicates that the service request message is valid in the initial user equipment message, so as to solve the problem that the mobility management entity is unable to make a correct judgment and corresponding logical processing and to improve processing efficiency of the mobile communication system.

It should be noted that, embodiments in the application and characteristics in the embodiments can be combined to each other in the absence of confliction. The disclosure will be described in detail with reference to the accompanying drawings in conjunction with the embodiments.

Figure 10:
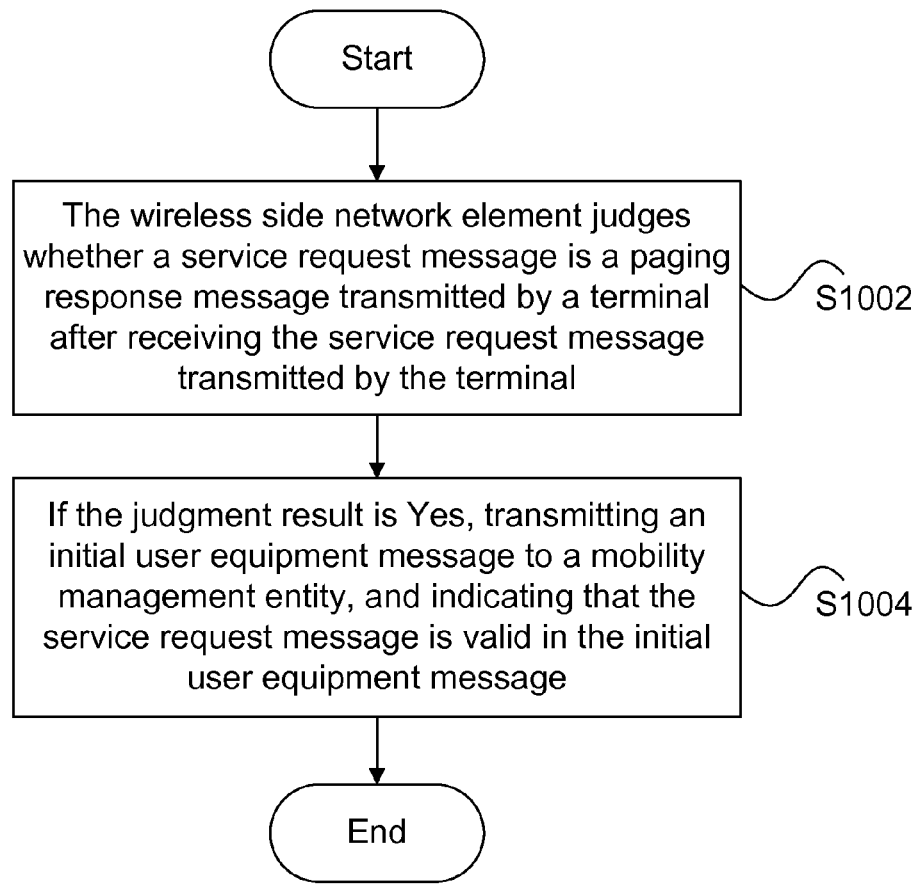
FIG. 10 is a flowchart of a method for status transition according to an embodiment of the disclosure.

A method for status transition is provided according to the embodiments of the disclosure. FIG. 10 is a flowchart of a method for status transition according to an embodiment of the disclosure, as shown in FIG. 10, comprising the following steps from step S1002 to step S1004:

step S1002: a wireless side network element judges that a service request message is a paging response message after receiving the service request message sent by a terminal, (i.e., a service request triggered by paging of a wireless side network element or a H(e)NB gateway);

wherein the wireless side network element needs to stop a paging waiting timer after receiving the service request message and before judging that the service request message is the paging response message, so as to judge that the service request message is the paging response message in the presence of the paging waiting timer or when the wireless side network element initiates a paging message within a predetermined period of time (wherein the predetermined time is the time preset by the wireless side network element);

further, the wireless side network element can be a base station, a H(e)NB, a radio network controller or a local gateway; the mobility management entity can be an MME, a mobile switching center or an SGSN; the local gateway can be an L-SGW and L-PGW, also can be an individual L-PGW, or a traffic offload function entity;

step S1004: transmitting an initial user equipment message to the mobility management entity if the judgment result is Yes, and indicating that the service request message is valid in the initial user equipment message;

moreover, the indication will not be contained in the initial user equipment message if the judgment result is No, i.e., reason code in S1002 is not added or modified.

Specifically, indicating that the service request message is valid in the initial user equipment message comprises: carrying data or signaling which is taken as reason code in the initial user equipment message, wherein the reason code represents data or signaling initialed by the terminal; or carrying reason code in the initial user equipment message, wherein the reason code represents that the service request message is a response message of performing paging to the wireless side network element (i.e., a paging response of the wireless side network element).

Wherein, the above reason code can be carried through Radio Resource Control Establishment Cause (RRC establishment cause) or cause or indication or service type, is or new cell added by expanding existing message. For example, if the RRC establishment cause or cause or indication or service type or new cell added by expanding existing message is data or signaling, it indicates that the data or signaling is taken as the data or signaling carrying reason code.

Wherein, the above mobility management entity comprises a mobile management unit, a Mobile Switch Center (MSC) and a serving general packet radio service support node. The wireless side network element comprises a base station, a H(e)NB, a Radio Network Controller (RNC) and a local gateway. The local gateway comprises an L-SGW and an L-PGW, an L-PGW, an L-GGSN and L-SGSN, and an L-GGSN. The above local IP access connection comprises a local IP access to residential IP network, a local IP access to enterprise IP network, a local IP access to Internet, a internet offload, and a selected IP traffic offload.

The implement process of the embodiments of the disclosure will be described in detail below in combination with examples.

Embodiment 1

Figure 11:
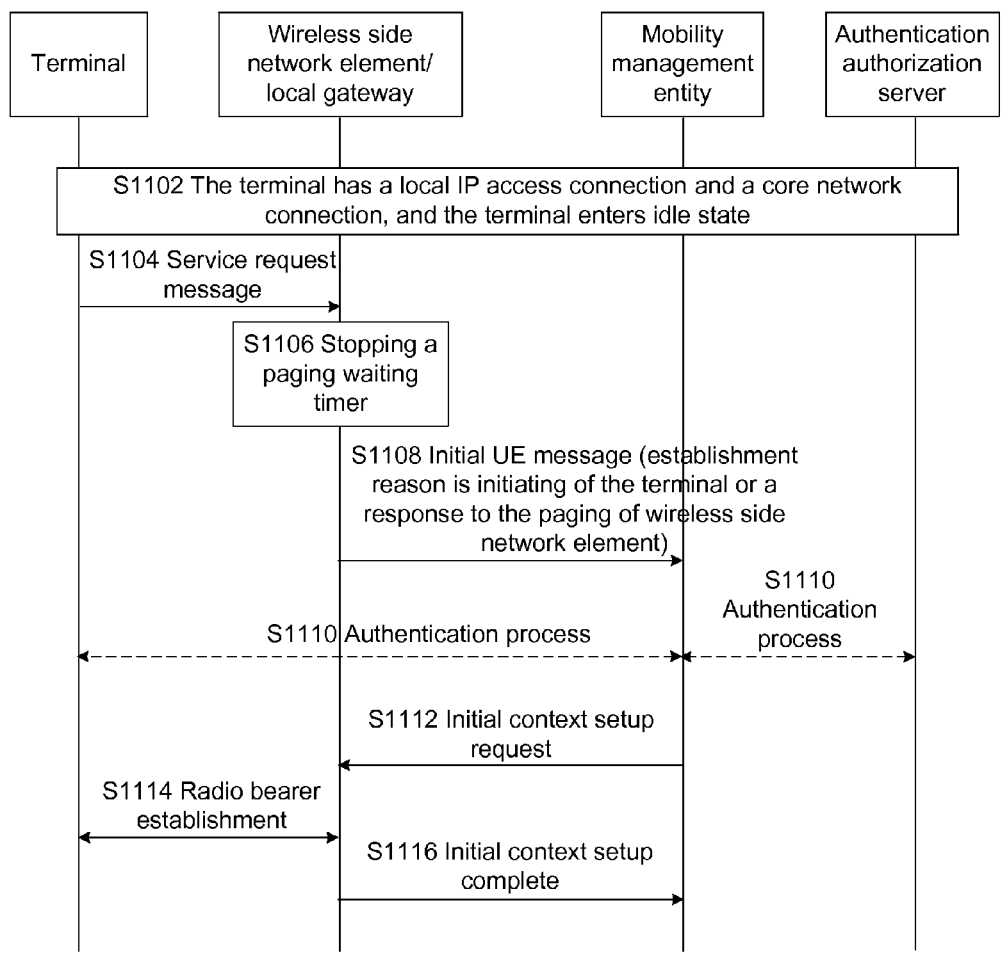
FIG. 11 is an interactive flowchart showing that a terminal performs a service request process based on an E-UTRAN system when transiting from idle state to connected state according to an embodiment of the disclosure.

FIG. 11 is an interactive flowchart showing that a terminal performs a service request process based on an E-UTRAN system when transiting from idle state to connected state according to an embodiment of the disclosure. The embodiment is based on situation of the system architecture of FIG. 3, in which a local gateway is an L-SGW and/or an L-PGW, as shown in FIG. 11, comprising the following steps from step S1102 to step S1116:

step S1102: a terminal has a local IP access connection and a core network connection after accessing to a wireless communication system, and then the terminal enters idle state;

step S1104: the terminal transmits a service request message to a wireless side network element (i.e., the above step S1002);

step S1106: the wireless side network element stops a paging waiting timer;

step S1108: the wireless side network element transmits an initial UE message to a mobility management entity.

If the wireless side network element finds that the service request is triggered by the paging of the wireless side network element, then carries, in the message, "data" or "signaling" which is taken as reason code (the reason code represents UE has pending user data or signaling to be sent), or a response to the paging of a wireless side network element or a H(e)NB gateway, so as to facilitate the mobility management entity to determine that the service request message is valid according to the reason code. Wherein the wireless side network element pages a UE in idle mode for downlink offload traffic arriving at the wireless side network element. Otherwise, the wireless side network element does not need to notify the mobility management entity of the reason code (i.e., the above step S1004).

Wherein, the above reason code can be carried through RRC establishment cause or cause or indication or service type or new cell added by expanding existing message. For example, if the RRC establishment cause or cause or indication or service type or new cell added by expanding existing message is "data" or "signaling", it indicates that the data or signaling is taken as the data or signaling carrying reason code.

Wherein, the above method for judging the service request triggered by paging of the wireless side network element is: the paging waiting timer is presented in the wireless side network element or the wireless side network element initiates a paging message within a period of time:

step S1110: Non-Access Stratum (NAS) identification (authentication) process; this step is optional;

step S1112: the mobility management entity transmits an initial context setup request message to the wireless side network element;

step S1114: the wireless side network element establishes radio bearer;

step S1116: the wireless side network element transmits the initial context setup complete message to the mobility management entity.

Embodiment 2

Figure 1:
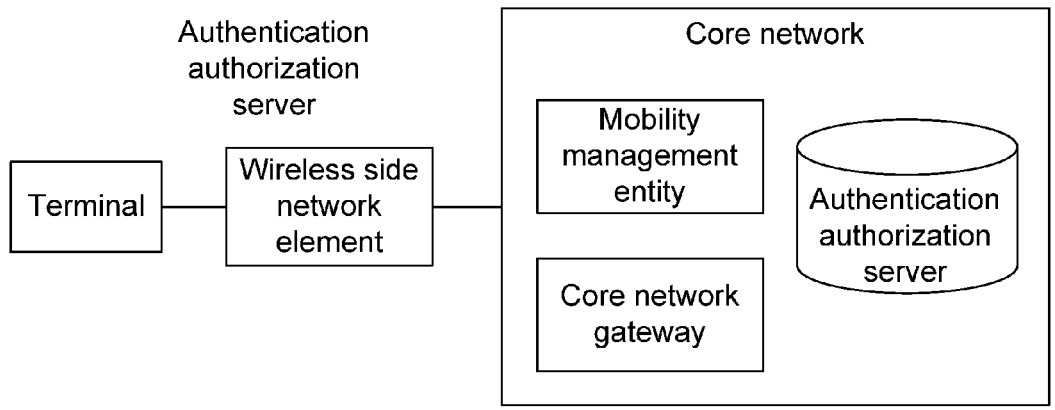
FIG. 1 is a schematic diagram I of an EPS system architecture according to related technology.
Figure 2:
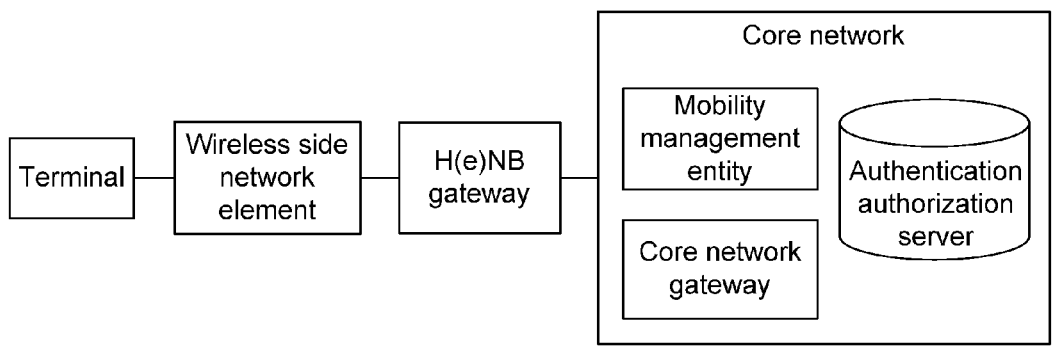
FIG. 2 is a schematic diagram II of an EPS system architecture according to related technology.
Figure 12:
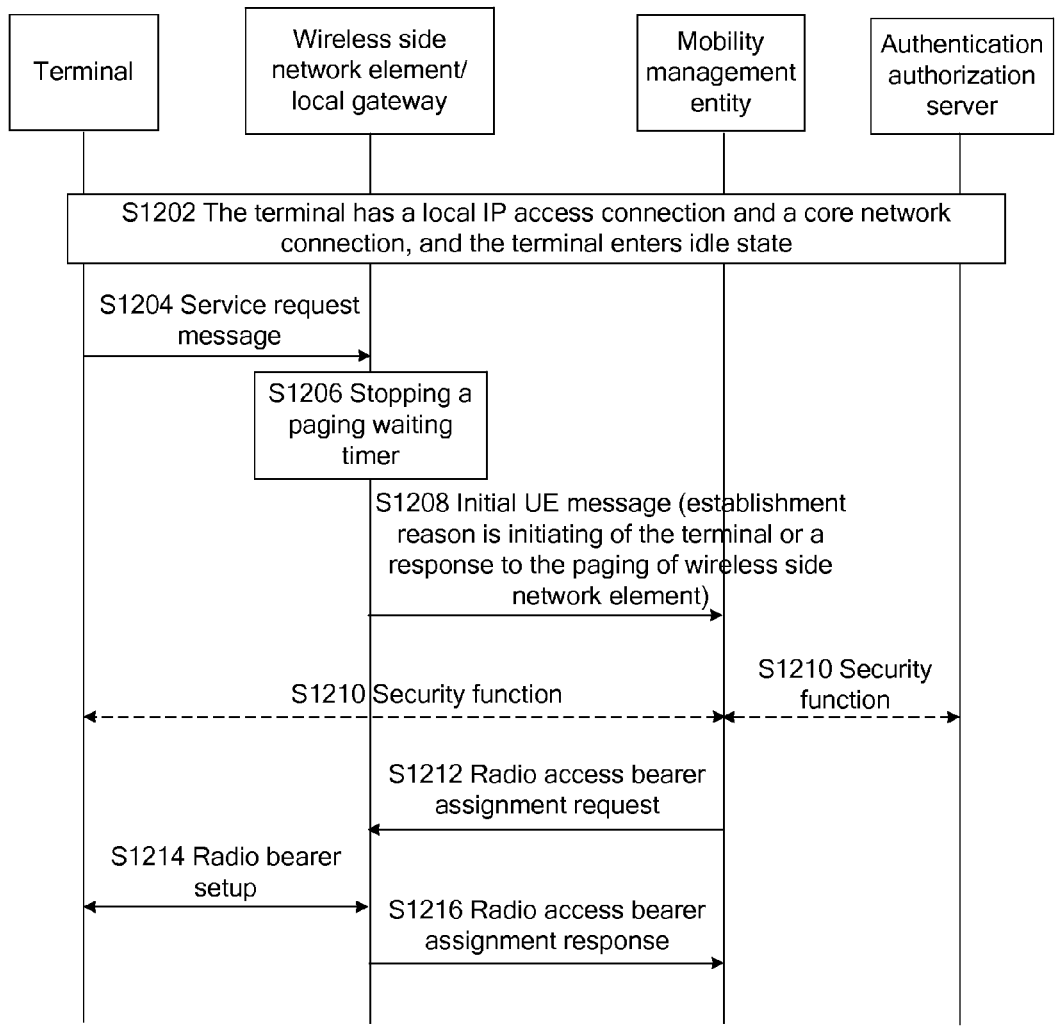
FIG. 12 is an interactive flowchart showing that a terminal performs a service request process based on an UTRAN system when transiting from idle state to connected state according to an embodiment of the disclosure.

FIG. 12 is an interactive flowchart showing that a terminal performs a service request process based on an UTRAN system when transiting from idle state to connected state according to an embodiment of the disclosure. The embodiment is based on situation of the system architecture of FIG. 2a, in which a local gateway is an L-GGSN, as shown in FIG. 12, comprising the following steps from step S1202 to step S1216:

step S1202: a terminal has a local IP access connection and a core network connection after accessing to a wireless communication system, and then the terminal enters idle state.

step S1204: the terminal transmits a service request message to a wireless side network element and carries a service type in the message (i.e., the above step S1002).

step S1206: the wireless side network element stops a paging waiting timer.

step S1208: the wireless side network element transmits an initial UE message to a mobility management entity.

If the wireless side network element finds that the service request is triggered by the paging of the wireless side network element, then carries, in the message, "data" or "signaling" which is taken as reason code (the reason code represents UE has pending user data or signaling to be sent), or a response to the paging of a wireless side network element or a H(e)NB gateway, so as to facilitate the mobility management entity to determine that the service request message is valid according to the reason code. Wherein the wireless side network element pages a UE in idle mode for downlink offload traffic arriving at the wireless side network element. Otherwise, the wireless side network element does not need to notify the mobility management entity of the reason code (i.e., the above step S1004).

Wherein, the above reason code can be carried through RRC establishment cause or cause or indication or service type or new cell added by expanding existing message. For example, if the RRC establishment cause or cause or indication or service type or new cell added by expanding existing message is "data" or "signaling", it indicates that the data or signaling is taken as the data or signaling carrying reason code.

Wherein, the above method for judging the service request triggered by paging of the wireless side network element is: the paging waiting timer is presented in the wireless side network element or the wireless side network element initiates a paging message within a period of time.

Step S1210: the mobility management entity executes a security function; this step is optional.

Step S1212: if the reason code carried in step S1208 is data, the mobility management entity transmits a radio access bearer assignment request message to the wireless side network element.

Step S1214: the wireless side network element establishes radio bearer.

Step S1216: the wireless side network element transmits a radio access bearer assignment response message to the mobility management entity.

To simplify description, when the base station or the H(e)NB or the RNC or the H(e)NB gateway is separately configured or jointly configured with the local gateway, except that the wireless side network element of step S1106 and S1108 in FIG. 11 specifically refers to the local gateway, and the base station or the H(e)NB transmits the service request message to the local gateway after step S1104, management of the paging timer, treatment of carrying reason in the message transmitted to the mobility management entity, and method for the mobility management entity to distinguish the service request message are similar to the above embodiment in FIG. 11, and do not affect the description of the disclosure, so it is unnecessary to give more details.

To simplify description, when the base station or the H(e)NB or the RNC or the H(e)NB gateway is separately configured or jointly configured with, the local gateway, except that the wireless side network element of step S1206 and S1208 in FIG. 12 specifically refers to the local gateway, and the base station or the H(e)NB or the RNC transmits the service request message to the local gateway after step S1204, management of the paging timer, treatment of carrying reason in the message transmitted to the mobility management entity, and the method for the mobility management entity to distinguish the service request message are similar to the above embodiment in FIG. 12, and do not affect the description of the disclosure, so it is unnecessary to give more details.

In addition, if the base station or the H(e)NB or the RNC or the H(e)NB gateway is jointly configured with the local gateway, the jointly configured network element can be the wireless side network element. In this situation, the management of the paging timer, the treatment of carrying reason in the message transmitted to the mobility management entity and the method for the mobility management entity to distinguish the service request message are similar to the above embodiments, and do not affect the description of the disclosure, so it is unnecessary to give more details.

Figure 3:
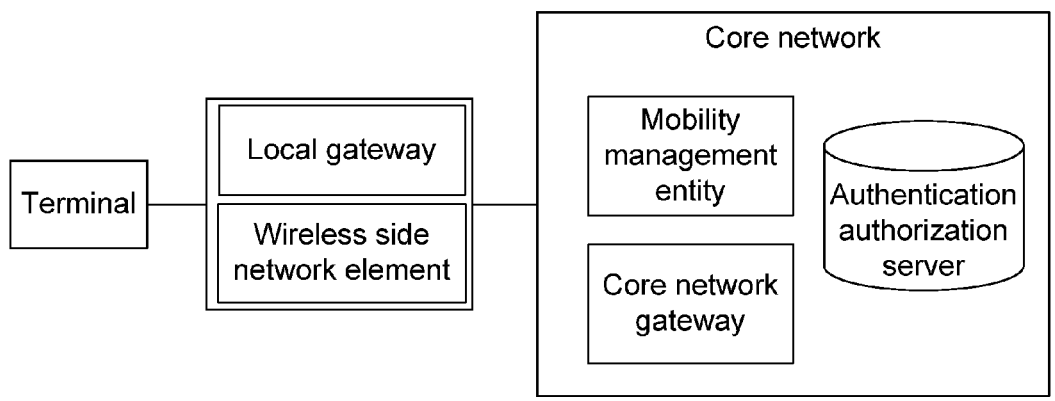
FIG. 3 is a schematic diagram III of an EPS system architecture according to related technology.
Figure 4:
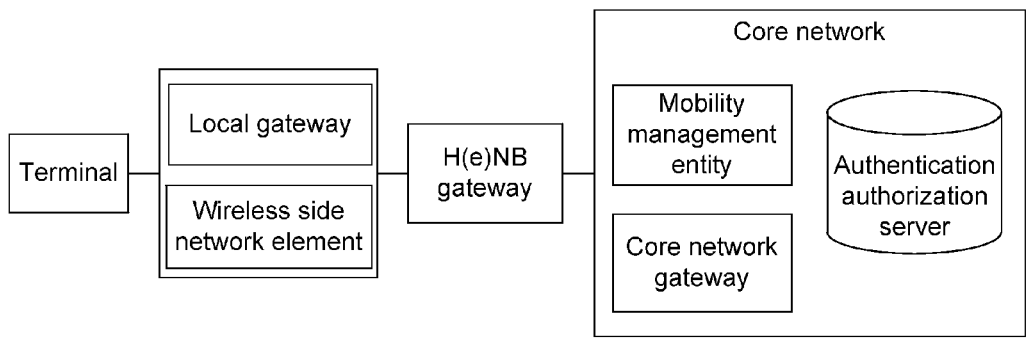
FIG. 4 is a schematic diagram IV of an EPS system architecture according to related technology.
Figure 5:
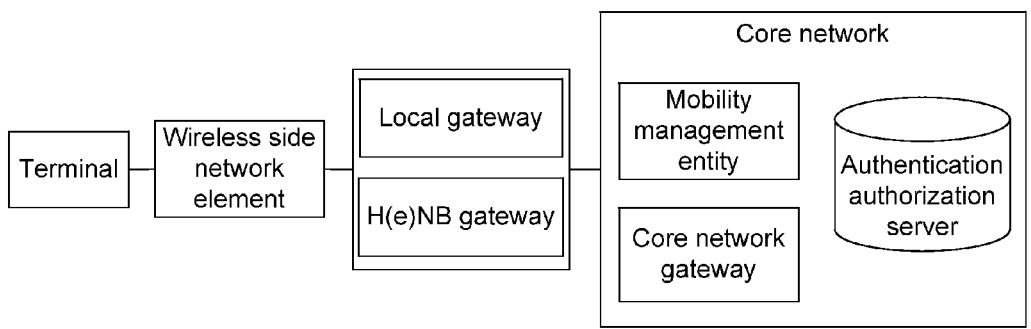
FIG. 5 is a schematic diagram V of an EPS system architecture according to related technology.
Figure 6:
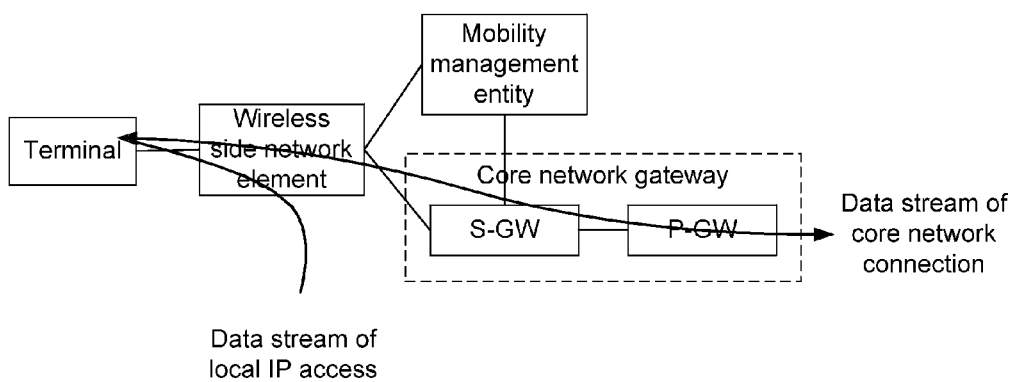
FIG. 6 is a data stream schematic diagram I of local IP access and core network connection based on the wireless communication system in FIG. 1 according to related technology.
Figure 7:
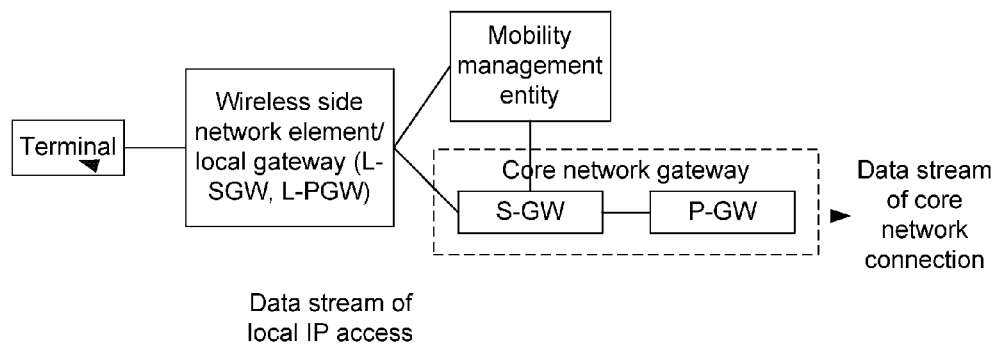
FIG. 7 is a data stream schematic diagram II of local IP access and core network connection based on the wireless communication system in FIG. 2 according to related technology.
Figure 8:
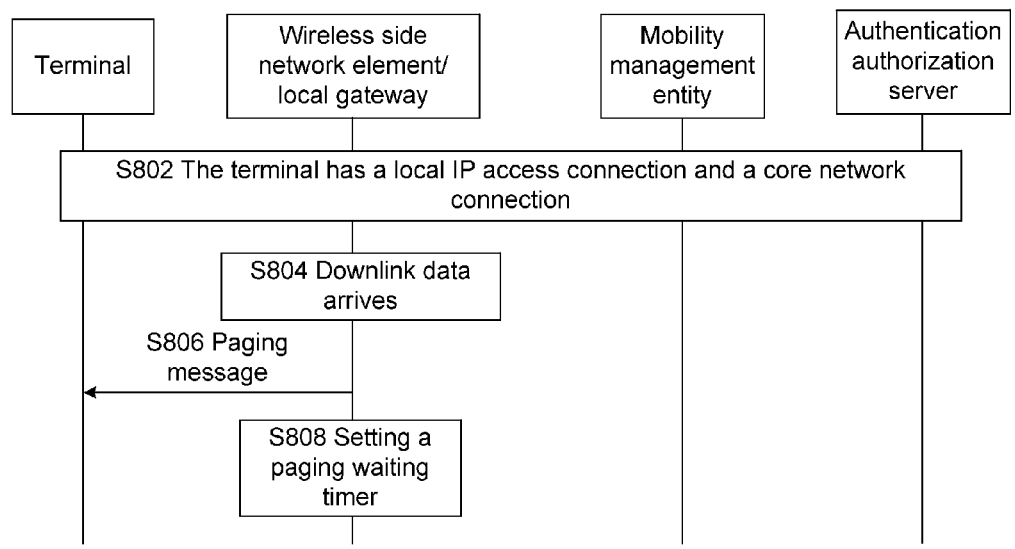
FIG. 8 is an interactive flowchart of a wireless side network element paging terminal according to related technology.
Figure 9:
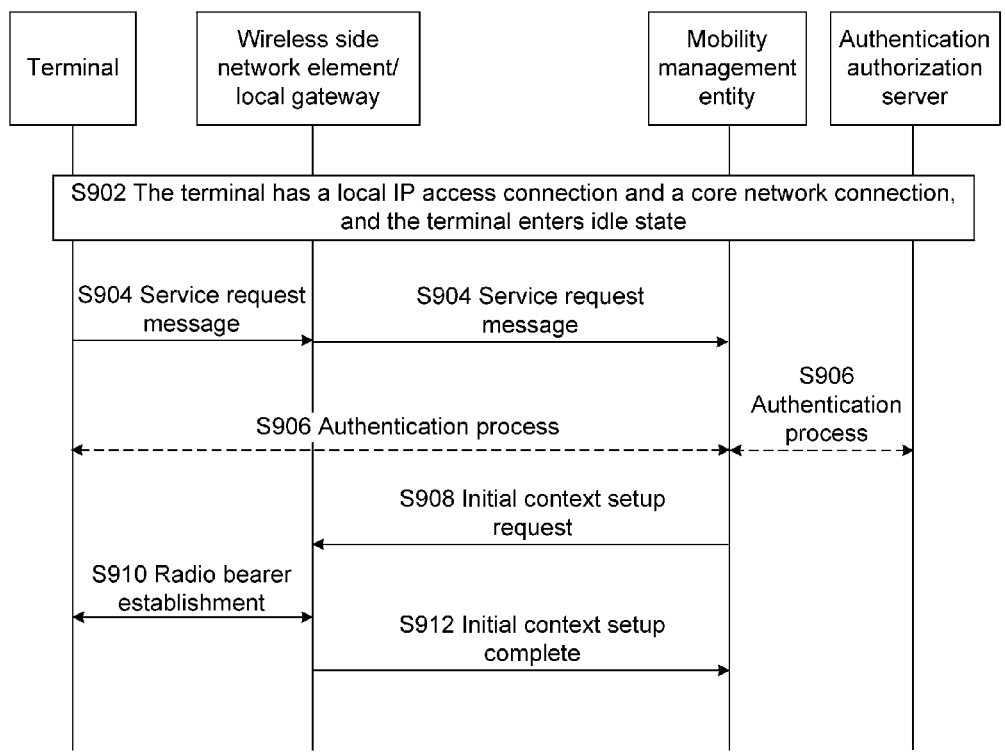
FIG. 9 is an interactive flowchart showing that a terminal performs service request process when transiting from idle state to connected state according to related technology.

To simplify description, in the above embodiments, the management mode of the local IP access connection is only described by taking condition of FIG. 3 as an example. For the system of FIG. 1, FIG. 2, FIG. 4 and FIG. 5, the management of the paging timer and the method for the mobility management entity to distinguish the service request message are similar to the above embodiments, and do not affect the description of the invention, so it is unnecessary to give more details.

The wireless side network element can be a base station, a H(e)NB, an RNC or a local gateway. The mobility management entity can be an MME, an MSC or an SGSN. The local gateway can be an L-SGW and L-PGW, an individual L-PGW, an L-GGSN and L-SGSN, an individual L-GGSN or a traffic offload function entity.

Address of the wireless side network element accessed by the local IP can be the same as that of the local gateway.

The local IP access connection can be a local IP access to residential IP network, a local IP access to enterprise IP network, a local IP access to Internet, a internet offload and a selected IP traffic offload.

The embodiments of the disclosure provide a processing method for a terminal to transit from idle state to connected state, so as to solve the management of the paging timer and the method for the mobility management entity to distinguish the service request message under the condition of local IP access.

It should be noted that, the steps shown in the flowchart of the drawings can be executed in a computer system such as a group of computer executable instructions, moreover, although a logic sequence is shown in the flowchart, the steps shown or described can be executed in a sequence different from the above sequence in some cases.

Figure 13:
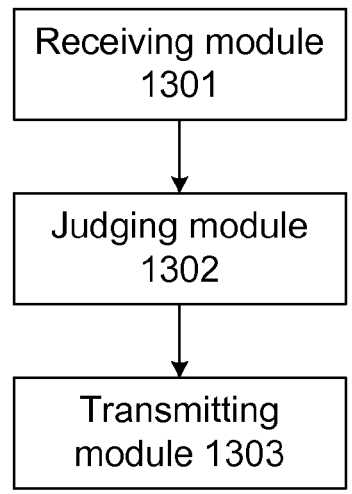
FIG. 13 is a structure diagram of an apparatus for status transition according to an embodiment of the disclosure.

According to an embodiment of the invention, an apparatus for status transition is provided. The apparatus can be configured to implement the above method for status transition. FIG. 13 is a structure diagram of an apparatus for status transition according to an embodiment of the disclosure; as shown in FIG. 13, the apparatus comprises a receiving module 1301, a judging module 1302 and a transmitting module 1303. The above structure is described in detail below.

The receiving module 1301 is configured to receive a service request message transmitted by a terminal; the judging module 1302, which is connected to the receiving module 1301, is configured to judge that the service request message received by the receiving module 1301 is a paging response message and notify the transmitting module 1303 of this condition; the transmitting module 1303, which is connected to the judging module 1302, is configured to transmit a initial user equipment message to the mobility management entity according to the notification of the judging module 1302 and indicate that the service request message is valid in the initial user equipment message.

Figure 14:
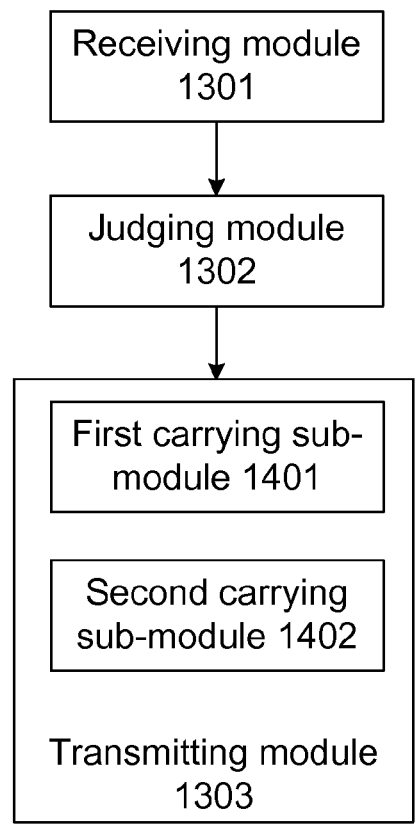
FIG. 14 is a preferred structure diagram of an apparatus for status transition according to an embodiment of the disclosure.

FIG. 14 is a preferred structure diagram of an apparatus for status transition according to an embodiment of the disclosure; as shown in FIG. 14, the transmitting module 1303 comprises: a first carrying sub-module 1401 and a second carrying sub-module 1402. The above structure is described in detail below.

The first carrying sub-module 1401 is configured to carry data or signaling which is taken as reason code in the initial user equipment message (the reason code represents data or signaling initiated by the terminal); the second carrying sub-module 1402 is configured to carry reason code in the initial user equipment message, wherein the reason code represents that the service request message is a response message for paging performed by a wireless side network element.

To sum up, through the above embodiments of the disclosure, a method and an apparatus for status transition are provided. The wireless side network element judges that the service request message is a paging response message after receiving the service request message, and transmits the initial user equipment message to the mobility management entity, and indicates that the service request message is valid in the initial user equipment message to solve the problem that the mobility management entity is unable to make a correct judgment and corresponding logical processing, and to improve processing efficiency of the mobile communication system.

Obviously, those skilled in the art should understand that, each module or each step of the disclosure above can be implemented by a universal computing device, wherein the modules and steps can be concentrated on a single computing device or distributed on a network composed of a plurality of computing devices; optionally, they can be realized with program code which can be executed by a computing device; therefore, they can be stored in a storing device to be executed by a computing device, or be respectively made into integrated circuit module each, or multiple modules or steps of them can be made into a single integrated circuit module. In this way, the disclosure is not limited to any specific combination of software and hardware.

The above is only preferred embodiments of the disclosure, and is not used to limit the invention. For those skilled in the art, the disclosure may have various alterations and variations. Any modification, equivalent replacement, improvement and so on within the spirit and principle of the disclosure should be included within the scope of protection of the disclosure.

The invention claimed is:

1. A method for status transition, applied to a local IP access connection process of a wireless side network element or a H(e)NB gateway in packet switch (PS) domain, comprising:

sending a paging message to a terminal when downlink data of the local IP connection reaches the wireless side network element/local gateway;

sending a service request message to a mobility management entity after receiving the service request message from the terminal as a paging response, and indicating that the service request message is valid in initial user equipment (UE) message;

wherein the method for indicating that the service request message is valid comprises:
modifying service type information element (IE) to indicate "data" or "signaling" which is taken as reason code in the service request message, wherein the reason code represents UE has pending user data or signaling to be sent, or
carrying reason code in an initial user equipment message, wherein the reason code represents that the service request message is a response message of paging performed by the wireless side network element; the paging response message is a response to the paging of the wireless side network element or the H(e)NB gateway.

2. The method according to claim 1, wherein the reason code is contained in at least one of the following information:
a radio resource control establishment code;
an indication or service type;
a new cell added by expanding existing message format.

3. The method according to claim 2, wherein
the mobility management entity comprises one of the followings:
a mobile management unit, a mobile switching centre and a serving general packet radio service support node;
the wireless side network element comprises one of the followings:
a base station, a H(e)NB, a radio network controller and a local gateway.

4. The method according to claim 3, wherein the local gateway comprises one of the followings:
a local service gateway and local packet data network gateway, a local packet data network gateway, a local serving general packet radio service support node and local gateway general packet radio service support node, a local gateway general packet radio service support node, and a traffic offload function entity.

5. The method according to claim 1, wherein
the mobility management entity comprises one of the followings:
a mobile management unit, a mobile switching centre and a serving general packet radio service support node;
the wireless side network element comprises one of the followings:
a base station, a H(e)NB, a radio network controller and a local gateway.

6. The method according to claim 5, wherein the local gateway comprises one of the followings:
a local service gateway and local packet data network gateway, a local packet data network gateway, a local serving general packet radio service support node and local gateway general packet radio service support node, a local gateway general packet radio service support node, and a traffic offload function entity.

7. The method according to claim 1, wherein the method further comprising: stopping a paging waiting timer before judging that the service request message is the paging response message.

8. The method according to claim 7, wherein
the mobility management entity comprises one of the followings:
a mobile management unit, a mobile switching centre and a serving general packet radio service support node;
the wireless side network element comprises one of the followings:
a base station, a H(e)NB, a radio network controller and a local gateway.

9. The method according to claim 8, wherein the local gateway comprises one of the followings:
a local service gateway and local packet data network gateway, a local packet data network gateway, a local serving general packet radio service support node and local gateway general packet radio service support node, a local gateway general packet radio service support node, and a traffic offload function entity.

10. The method according to claim 1, wherein
determining that the service request message is the paging response in the presence of a paging waiting timer or when the wireless side network element initiates a paging message within a predetermined period of time.

11. The method according to claim 10, wherein
the mobility management entity comprises one of the followings:
a mobile management unit, a mobile switching centre and a serving general packet radio service support node;
the wireless side network element comprises one of the followings:
a base station, a H(e)NB, a radio network controller and a local gateway.

12. The method according to claim 11, wherein the local gateway comprises one of the followings:
a local service gateway and local packet data network gateway, a local packet data network gateway, a local serving general packet radio service support node and local gateway general packet radio service support node, a local gateway general packet radio service support node, and a traffic offload function entity.

13. The method according to claim 1, wherein the method further comprising:
judging that the service request message is not a paging response, determining not to modify reason code in the initial user equipment message.

14. The method according to claim 1, wherein
the mobility management entity comprises one of the followings:
a mobile management unit, a mobile switching centre and a serving general packet radio service support node;
the wireless side network element comprises one of the followings:
a base station, a H(e)NB, a radio network controller and a local gateway.

15. The method according to claim 14, wherein the local gateway comprises one of the followings:
a local service gateway and local packet data network gateway, a local packet data network gateway, a local serving general packet radio service support node and local gateway general packet radio service support node, a local gateway general packet radio service support node, and a traffic offload function entity.

16. The method according to claim 13, wherein
the mobility management entity comprises one of the followings:
a mobile management unit, a mobile switching centre and a serving general packet radio service support node;
the wireless side network element comprises one of the followings:
a base station, a H(e)NB, a radio network controller and a local gateway.

17. The method according to claim 16, wherein the local gateway comprises one of the followings:
a local service gateway and local packet data network gateway, a local packet data network gateway, a local serving general packet radio service support node and local gateway general packet radio service support node, a local gateway general packet radio service support node, and a traffic offload function entity.

18. The method according to claim 1, wherein the local IP access connection comprises one of the followings:

a local IP access to residential IP network, a local IP access to enterprise IP network, a local IP access to Internet, a internet offload, a selected IP traffic offload.

19. An apparatus for status transition, applied to a local IP access connection process of a wireless side network element or a H(e)NB gateway in packet switch (PS) domain;

a wireless side network element/local gateway sends a paging message to a terminal when downlink data of the local IP connection reaches the wireless side network element/local gateway, comprising:

a receiving module, which is configured to receive a service request message from the terminal;

a judging module, which is configured to notify transmitting module when judging that the service request message is a paging response message;

the transmitting module, which is configured to transmit an initial user equipment message to a mobility management entity according to the notification of the judging module; wherein, the initial user equipment message is used for indicating that the service request message is valid;

wherein the transmitting module comprises:

a first carrying sub-module, which is configured to modify service type information element (IE) to indicate "data" or "signaling" which is taken as reason code in the service request message, wherein the reason code represents UE has pending user data or signaling to be sent;

a second carrying sub-module, which is configured to carry reason code in the initial user equipment message, wherein the reason code represents that the service request message is a response message to the paging performed by a wireless side network element.

* * * * *